US012736344B2

(12) United States Patent
Le Traon et al.

(10) Patent No.: US 12,736,344 B2
(45) Date of Patent: Sep. 15, 2026

(54) VIBRATING GYROMETER WITH PLANAR STRUCTURE

(71) Applicant: OFFICE NATIONAL D'ETUDES ET DE RECHERCHES AÉROSPATIALES, Palaiseau (FR)

(72) Inventors: Olivier Le Traon, Palaiseau (FR); Raphaël Levy, Palaiseau (FR); Jean Guerard, Palaiseau (FR); Thomas Perrier, Palaiseau (FR)

(73) Assignee: OFFICE NATIONAL D'ETUDES ET DE RECHERCHES AÉROSPATIALES, Palaiseau (FR)

( * ) Notice: Subject to any disclaimer, the term of this patent is extended or adjusted under 35 U.S.C. 154(b) by 398 days.

(21) Appl. No.: 18/549,106

(22) PCT Filed: Mar. 1, 2022

(86) PCT No.: PCT/FR2022/050368
§ 371 (c)(1),
(2) Date: Sep. 5, 2023

(87) PCT Pub. No.: WO2022/189730
PCT Pub. Date: Sep. 15, 2022

(65) Prior Publication Data

US 2024/0053147 A1 Feb. 15, 2024

(30) Foreign Application Priority Data

Mar. 10, 2021 (FR) ....................................... 2102249

(51) Int. Cl.
*G01C 19/5733* (2012.01)
*G01C 19/5607* (2012.01)
(Continued)

(52) U.S. Cl.
CPC ..... *G01C 19/5733* (2013.01); *G01C 19/5607* (2013.01); *G01C 19/5621* (2013.01); *G01C 19/5656* (2013.01)

(58) Field of Classification Search
CPC ............ G01C 19/5621; G01C 19/5656; G01C 19/5733; G01C 19/5607
See application file for complete search history.

(56) References Cited

U.S. PATENT DOCUMENTS

| | | | |
|---|---|---|---|
| 3,683,213 | A | 8/1972 | Staudte |
| 4,215,570 | A | 8/1980 | Nisse |

(Continued)

FOREIGN PATENT DOCUMENTS

| | | | |
|---|---|---|---|
| CN | 106441261 | A | 2/2017 |
| EP | 0194394 | A1 | 9/1986 |

(Continued)

OTHER PUBLICATIONS

J.S. Burdess et al., "The Theory of a Piezoelectric Disc Gyroscope", IEEE Transactions on Aerospace and Electronic Systems, Jul. 1986, vol. AES-22, Issue 4, 9 pages, University of Newcastle upon Tyne.

(Continued)

*Primary Examiner* — Helen C Kwok
(74) *Attorney, Agent, or Firm* — Maier & Maier, PLLC

(57) ABSTRACT

An inertial angular position sensor includes at least three identical resonators which are arranged symmetrically about a sensitive axis of the sensor, so that a rate gyro constructed from the sensor has an integrating operation. The sensor further includes a coupling element which connects a vibrating portion of each resonator to the vibrating portions of all other resonators of the sensor. Preferred configurations for the inertial angular position sensor allow obtaining integrating rate gyros with high sensitivity and low production cost.

9 Claims, 10 Drawing Sheets

(51) Int. Cl.

| | |
|---|---|
| ***G01C 19/5621*** | (2012.01) |
| ***G01C 19/5656*** | (2012.01) |

(56) References Cited

U.S. PATENT DOCUMENTS

| | | | | |
|---|---|---|---|---|
| 4,524,619 | A | 6/1985 | Staudte | |
| 4,710,668 | A | 12/1987 | Fima et al. | |
| 7,040,163 | B2 | 5/2006 | Shcheglov et al. | |
| 10,415,968 | B2 | 9/2019 | Prikhodko et al. | |
| 2014/0208848 | A1 * | 7/2014 | Krylov | G01C 19/06<br>73/504.12 |
| 2016/0341551 | A1 * | 11/2016 | Cook | G01C 19/5733 |
| 2016/0349054 | A1 | 12/2016 | Hwang et al. | |
| 2018/0172447 | A1 * | 6/2018 | Prikhodko | G01P 15/14 |
| 2024/0133691 | A1 * | 4/2024 | Le Traon | G01L 5/042 |
| 2024/0142234 | A1 * | 5/2024 | Ma | G01C 19/5747 |

FOREIGN PATENT DOCUMENTS

| | | | |
|---|---|---|---|
| FR | 2574209 | A1 | 6/1986 |
| FR | 2723635 | A1 | 2/1996 |

OTHER PUBLICATIONS

G.H. Bryan, “On a revolving cylinder or bell”, in the Proceedings of the Cambridge Philosophical Society, Oct. 28, 1889-May 30, 1892, vol. VII, pp. 101-111, Printed at the University Press.

A.A. Trusov et al., “Flat Is Not Dead: Current and Future Performance of Si-MEMS Quad Mass Gyro (QMG) System”, IEEE Translations on Aerospace and Electronic Systems, 1986, 7 pages, downloaded on Nov. 22, 2020 from IEEE Xplore, DOI : 10.1109/PLANS.2014.6851383, 2014.

International Search Report w/English translation and Written Opinion of the ISA for PCT/FR2022/050368 mailed Jul. 14, 2022, 16 pages.

* cited by examiner

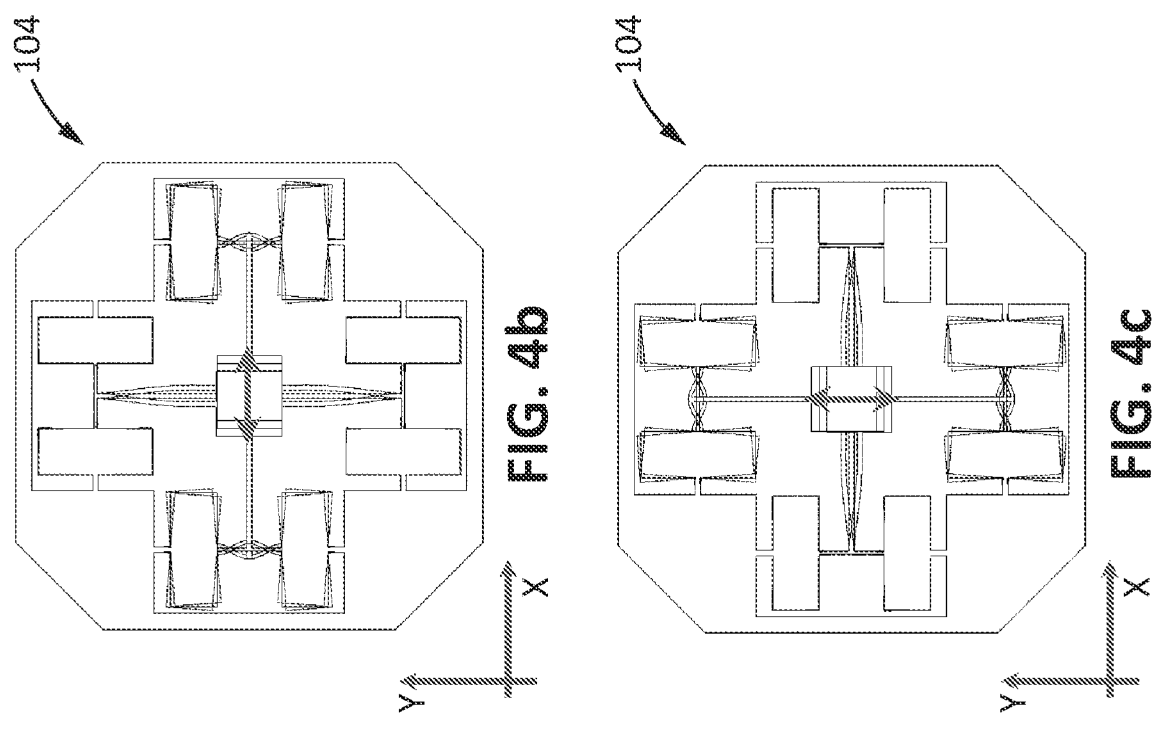
FIG. 4b
FIG. 4c
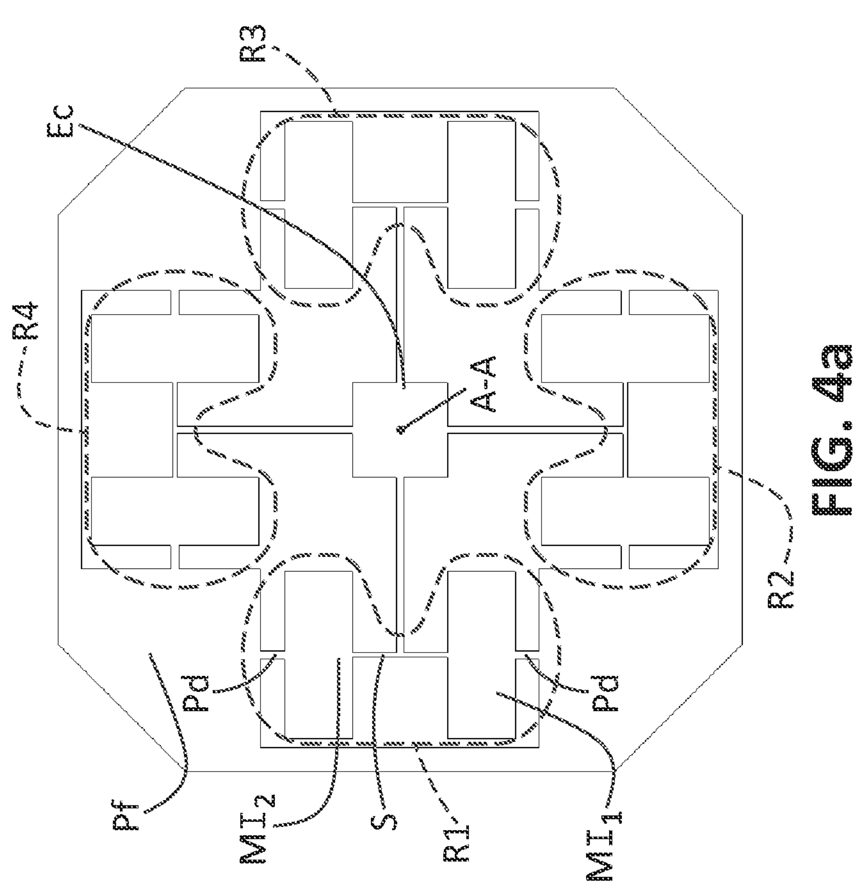
FIG. 4a

105
X
Y

105
X
Y

Pd
R3
Pd
Ec
A-A
R2
Pf
105
Pd
R1
Xc
Yc-
Yc
Yc+

106

X
Y
106

X
Y
106
R3
Pd
Ec
A-A
R2
Pd
Pf
R1
Pd

Xc
Yc-
Yc
Yc+

107

X
Y
107

X
Y
107
R3
Pd
R4
Pd
Pd
Ec
A-A
Pf
R1
Pd
R2

VIBRATING GYROMETER WITH PLANAR STRUCTURE

CROSS-REFERENCE TO RELATED APPLICATIONS

This application is the US national stage of PCT/FR2022/050368, filed Mar. 1, 2022, and designating the United States, which claims the priority of FR FR2102249, filed Mar. 10, 2021. The entire contents of each foregoing application are incorporated herein by reference.

TECHNICAL FIELD

This invention relates to an inertial angular position sensor, as well as to a gyrometer which comprises such a sensor. It provides several models of gyrometers having planar structures, which can be produced by collective etching processes and which each provide the operation of an integrating gyrometer. The invention applies both to piezoelectric materials such as quartz crystal, and to other crystalline materials which are common in the field of microsystems, such as silicon.

PRIOR ART

In a known manner, it is possible to form a gyrometer from at least one vibrating portion which has at least two distinct modes of vibration, when these two modes are capable of being coupled to each other by a rotation which is applied to the at least one vibrating portion. The gyrometer then comprises, in addition to the vibrating portion(s), means for exciting one of the two vibration modes, referred to as pilot mode, and means for detecting an amplitude of vibration of the other mode, referred to as sensing mode.

For what are referred to as integrating gyrometers, it is not the speed of rotation that is measured directly, but a value that corresponds to the angle of rotation through which the gyro has been rotated relative to a Galilean frame of reference. This operating principle is known as the "inertiality of the vibration of a body", and was demonstrated by Leon Foucault with his pendulum in 1851. It concerns the resulting expression of inertial forces which were revealed by Gustave Coriolis, when these inertial forces are exerted on one or more resonator(s) which does not have any preferred axis of vibration. Direct measurement of the result of integrating the angular velocity over time can be very advantageous for highly dynamic applications, and when information about angular deviation is essential. Such is the case, in particular, in inertial navigation applications.

Such well-known integrating gyrometers use hemispherical resonators or bells, as theorized by Lord Bryan in 1892 in the article "On a revolving cylinder or bell", Proceedings of the Cambridge Philosophical Society, Volume VII, Oct. 28, 1889-May 30, 1892. For such resonator configurations, the rotation produces partial entrainment of the resonator vibration, which results from a partial transfer of vibrational energy between two modes of the resonator which are degenerate.

In a known manner, two modes of vibration are said to be degenerate when they correspond to separate categories of geometric deformations of the resonator, but have the same vibration frequency value. Throughout the present description, the mode of vibration of a resonator or of an inertial angular position sensor is simply designated as one of its eigenmodes of vibration, i.e. for which a vibration in process in this mode continues without mixing with another eigenmode of vibration of the resonator or sensor, in the absence of outside interference. In the case of a gyrometer, it is the Coriolis force which produces a coupling between two eigenmodes, so that a vibration which is excited according to one of the two eigenmodes is partially or wholly transferred to the other eigenmode. The intensity of this transfer of vibrational energy constitutes a measurement of the speed of rotation, or of the angle of rotation in the case of an integrating gyrometer.

Another example of an integrating gyrometer is based on a beam which is intended to vibrate flexurally, when this beam is made of an isotropic material and has a cross-section such that its flexural inertia is identical between at least two flexural directions which are different. Such is the case, in particular, when the cross-section of the beam is circular, square, or even an isosceles triangle, and more generally when the beam does not have a preferred axis of flexural vibration, in contrast to the case of a beam having a rectangular cross-section. The reader will have understood that any asymmetry of the beam or of its embedding in a support is likely to ruin the desired effect, and that to obtain inertiality of the vibration, the vibrating portion must be able to be considered as being isolated from the outside world, meaning that its vibration does not depend on the attachment conditions of the vibrating portion. In addition, it may be necessary for the material of the vibrating portion to have suitable symmetry for the vibration considered.

For resonators in the form of microsystems, planar structures are necessary in order to be easily achievable by collective manufacturing processes based on a wafer of the material chosen for forming the resonator(s) of the gyrometer. This material is conventionally monocrystalline or polycrystalline silicon, or quartz crystal.

For silicon-based resonators, masses are usually set in motion by using electrostatic forces, and the motions thus generated are usually detected by capacitance measurements made on at least one capacitor which is formed between a moving part and a fixed part.

For resonators made of piezoelectric material, the useful excitation of vibration by piezoelectric effect and the useful signal which is detected no longer consist of movements, but of mechanical stress or deformation. As a result, resonator structures where the stress and deformation are distributed across an extended area of the resonator are more suitable for piezoelectric material than structures in the form of non-deformable inertial masses associated with springs, for which the stresses and deformations are located only in the parts of the material acting as a spring.

An integrating gyrometer with planar structure and made of piezoelectric material was proposed in the article entitled "The theory of a piezoelectric disc gyroscope", J. S. Burdess et al., IEEE Transactions on Aerospace And Electronic Systems, 1986, Volume: AES-22, issue 4. The resonator considered in that article has a disc shape, and its two degenerate modes of vibration are selected by the design of the excitation and detection electrodes. An oscillating electronic circuit makes it possible to follow the natural precession of the vibration when the resonator is subjected to axis rotation perpendicular to the disc. The main disadvantage of this gyro arises from the resonator's great sensitivity to its attachment conditions: the attachment area, which is located in the center of the disc, must be large enough to allow effective attachment of the resonator, but it then greatly alters the frequencies and dampings of the two useful modes of vibration. Most often, the attachment area causes a loss of degeneracy of the two modes, making it difficult or even impossible to operate as an integrating gyrometer. Improvements have been proposed, for example in FR 2,723,635, by using higher order modes, but without achieving sufficient isolation of the resonator from its environment.

A disc shape for the resonator was also used with silicon material, by proposing an apertured disc enabling the insertion of means for excitation by electrostatic force, and means for capacitive detection of modes of vibration, as described in U.S. Pat. No. 7,040,163. But as was true with the disc made of piezoelectric material, its attachment at its center does not allow obtaining sufficient degeneracy of the modes of vibration, and requires resorting to balancing and/or electronic compensation techniques, which are complex and expensive.

Other vibrating structures implement non-deformable masses which are connected to stiffnesses and to coupling means between the masses, such as the one described in "Flat is not dead: current and future performance of Si-MEMS Quad Mass Gyro (QMG) system", A. A. Trusov et al., DOI: 10.1109/PLANS.2014.6851383. The structure described in that article is composed of four masses which are coupled together in pairs by systems of levers in order to force movements in phase opposition. However, these levers are complex to produce and require a high level of manufacturing precision in order to obtain symmetry between the modes of vibration in the plane of the structure. This structure therefore requires introducing ancillary systems to balance the useful modes, in particular by adding electrostatic stiffnesses.

Document CN 106,441,261A describes a micromechanical gyro with four oscillating masses which are connected to inner and outer rings, their connections to the inner ring being made by levers. The entire gyro is invariant under a 90° rotation.

Technical Problem

Based on this situation, an object of the present invention is to provide a new inertial angular position sensor for an integrating gyrometer, which is improved for at least some of the disadvantages of the prior sensors, as mentioned above.

An ancillary object of the invention is to provide such a sensor for which the vibrational energy losses to the outside are reduced, in order to provide a quality factor value which is increased, and to obtain two degenerate modes more easily.

Another ancillary object of the invention is to reduce the symmetry defects which can affect the shape of the sensor when the latter is produced by wet chemical etching processes, which are low-cost production processes, because of the differences in etch rate that exist between the different crystalline orientations of the material used to form the sensor.

SUMMARY OF THE INVENTION

To achieve at least one of these or other objects, a first aspect of the invention proposes a new inertial angular position sensor which comprises at least three identical resonators arranged symmetrically about an axis, referred to as the sensitive axis, so as to be invariant under a rotation of $2\pi/n$ about this sensitive axis, where n is the number of resonators of the sensor. The n resonators are coupled together so that the sensor has at least two degenerate modes of vibration, making it possible to characterize a rotation of the sensor about the sensitive axis.

According to a first characteristic of the sensor of the invention, each of the resonators comprises a respective portion of a wafer having two opposite faces which are flat and parallel, the wafer portion dedicated to each resonator being intended to vibrate during use of the sensor, and referred to as the vibrating portion of that resonator. Furthermore, the wafer is common to the n resonators of the sensor.

According to a second characteristic of the sensor of the invention, each vibrating portion is intended to vibrate flexurally during use of the sensor.

Finally, according to a third characteristic of the sensor of the invention, the sensor further comprises a coupling element which connects the vibrating portion of each resonator to the vibrating portions of all the others among the n resonators of the sensor, the coupling element also being invariant under the rotation of $2\pi/n$ about the sensitive axis, and the vibrating portions of the n resonators being angularly distributed about the coupling element.

The sensor of the invention can be produced industrially at low cost, using collective manufacturing processes based on the wafer intended to form the vibrating portion of each of the n resonators.

In addition, the inertial angular position sensor of the invention is suitable for being part of the composition of an integrating gyrometer, because it has two modes of vibration which are degenerate and for which the vibrational energy is likely to be transferred from one mode to another by a rotation undergone by the sensor, about its sensitive axis relative to a Galilean frame of reference. More precisely, the value of the number of separate resonators which form the sensor, greater than or equal to three, makes it possible to combine the existence of a pair of degenerate modes of vibration with the possibility for rotation about the sensitive axis to transfer energy between them. As reminded above, the two modes which are degenerate have a common vibration frequency value, but it is possible for the sensor to have several vibration frequency values which are each associated with two degenerate modes of vibration.

Finally, as the coupling element of the sensor of the invention is invariant under a rotation of $2\pi/n$ about the sensitive axis of the sensor, it preserves the degeneracy between the two modes of vibration of the set of resonators while ensuring good efficiency, for a rotation about the sensitive axis which is to be measured, in transferring vibrational energy between the two degenerate modes of vibration. The sensor thus provides high detection and measurement sensitivity for a gyrometer in which it is incorporated.

Preferably, the number n of resonators in the sensor is less than or equal to eight.

Preferably also, each vibrating portion may be intended to vibrate flexurally in parallel to the faces of the wafer during use of the sensor.

Preferably again, the coupling element may be composed of a pattern which is formed in the wafer, being integral with the vibrating portion of each of the resonators of the sensor.

According to a fourth characteristic of the invention, the vibrating portion of each resonator is connected to a support part of the sensor which is external to the vibrating portions and to the coupling element, by an intermediate segment of the wafer, referred to as the foot. The foot is integral with the vibrating portion and forms a connection between the latter and the support part. Then, for each resonator:

- the vibrating portion of this resonator has a first plane of symmetry, referred to as the midplane, which is parallel to both faces of the wafer and equidistant from these two faces, and a second plane of symmetry, referred to as the plane of symmetry orthogonal to the wafer, which is perpendicular to the midplane and passes longitudinally through the connection formed by the foot between the support part and the vibrating portion, an intersection between the midplane and the plane of symmetry orthogonal to the wafer forms a center axis of the vibrating portion, the vibrating portion comprises two extensions which are each intended to vibrate flexurally, these two extensions extending symmetrically from the foot on each side of the plane of symmetry orthogonal to the wafer, each extension is provided with a longitudinal slot which passes through the vibrating portion perpendicularly to the midplane, from the plane of symmetry orthogonal to the wafer towards a distal end of this extension but without reaching said distal end, such that each extension is meander shaped, the respective slots of both extensions are symmetrical relative to the plane of symmetry orthogonal to the wafer, and meet at this plane of symmetry orthogonal to the wafer, so that the vibrating portion comprises two primary segments which each connect the foot to the distal end of one of the extensions, and two secondary segments which are interconnected at the plane of symmetry orthogonal to the wafer by respective proximal ends of these secondary segments, and which each extend to the distal end of one of the extensions so as to connect to one of the primary segments at that distal end.

Thanks to such configuration of the vibrating portion of each of the resonators of the sensor, for both degenerate modes of vibration of the sensor which make it possible to characterize the rotation about the sensitive axis, this vibrating portion has only movements which are parallel to the midplane and which are symmetrical relative to the plane of symmetry orthogonal to the wafer. Moreover, both primary segments have instantaneous velocity components, parallel to the center axis, which at each instant during vibration, are in the opposite direction to that of instantaneous velocity components of the secondary segments, also parallel to the center axis. These opposing velocity orientations allow some of the momentum components associated with them to at least partially compensate for each other for each resonator, such that movements transmitted to the foot of this resonator by the vibrating portion are reduced. As a result, the resonator has low vibrational energy losses, and therefore its quality factor can be high. Consequently, the quality factor of the sensor which is effective for each of the two degenerate modes of vibration is also high.

Advantageously, for each resonator, the vibrating portion may have a mass distribution such that each degenerate mode of vibration of the sensor which comprises only movements parallel to the midplane and which is symmetrical relative to the plane of symmetry orthogonal to the wafer, for the resonator considered, does not cause any movement of the foot in parallel to the center axis. In other words, compensation for the momentum components of each vibrating portion which are parallel to the center axis of the resonator considered, can be exact or near-exact. In this case, the vibrational energy losses through the feet of the resonators are zero or almost zero, and the quality factor of the sensor for the two degenerate modes of vibration can be very high. In addition, such an absence of movement of the feet makes the sensor insensitive to symmetry defects which could exist in its attachment to an external base, and which could eliminate the degeneracy between the modes of vibration.

It is possible for each extension of each resonator to comprise, at its distal end and parallel to the midplane, a widening relative to outer longitudinal edges of the primary and secondary segments of this extension. Such widening provides an additional degree of freedom in order to provide compensation for the momentum components that are parallel to the center axis, within each vibrating portion. The designing of resonators which do not transmit movement through their feet is thus facilitated.

For the preferred embodiments of the invention, the coupling element may advantageously be connected to the vibrating portion of each resonator at the interconnected proximal ends of the secondary segments, in parallel to the center axis of the resonator and on a side of its vibrating portion which is opposite to its foot. Such a configuration of the sensor increases the transfer of vibrational energy produced by the rotation to be measured between the two degenerate modes of vibration, so the sensitivity of the sensor is even greater.

The wafer material may advantageously be monocrystalline and of trigonal class and piezoelectric. In this case, for each resonator of a preferred embodiment of the invention as specified above, the center axis of its vibrating portion can be parallel to an axis Xc of the material, and both primary segments as well as both secondary segments of this vibrating portion may be parallel to axes Yc of the material. Put another way, one of both extensions of each vibrating portion may be parallel to crystallographic axis Yc+ and the other parallel to crystallographic axis Yc−. They then form an angle between them which is equal to 60° (degrees). Thus, each of the sensor resonators can be symmetrical as is directly produced using a wet chemical etching process for etching the sensor pattern into the wafer. In particular, the wafer can be made of α-quartz crystal ($\alpha$-$SiO_2$) or any other crystal of the trigonal system of symmetry class 32, such as gallium orthophosphate ($GaPO_4$), germanium oxide ($GeO_2$), gallium arsenate ($GaAsO_4$), or the crystals of the LGX family: langasite (LGS or $La_3Ga_5SiO_{14}$), langatate (LGT or $La_3Ga_5$, 5TaO, $5O_{14}$), or langanite (LGN or $La_3Ga_5$, 5NbO, $5O_{14}$).

Alternatively, both extensions of each vibrating portion may form an angle between them which is equal to 90° or 180°.

In general for the invention, the sensor may further comprise:

excitation means, adapted for generating flexural deformations of the vibrating portions of the n resonators according to a first one of the degenerate modes of vibration of the sensor; and detection means, adapted for measuring a vibration amplitude of the sensor according to another of the degenerate modes of vibration which is different from the first degenerate mode of vibration.

Finally, a second aspect of the invention relates to a gyrometer which comprises a sensor in accordance with the first aspect of the invention. The functioning of such gyrometer uses the coupling which is produced by Coriolis forces between the two degenerate modes of vibration. Its type is an integrating gyrometer.

BRIEF DESCRIPTION OF FIGURES

The features and advantages of the invention will become more clearly apparent from the following detailed description of some non-limiting exemplary embodiments, with reference to the appended figures, which include:

FIG. 4*a* corresponds to [FIG. 1*a*] for a fourth inertial angular position sensor which is also in accordance with the invention;

FIG. 4*b* corresponds to [FIG. 1*b*] for the fourth inertial angular position sensor;

FIG. 4*c* corresponds to [FIG. 1*c*] for the fourth inertial angular position sensor;

DETAILED DESCRIPTION OF THE INVENTION

For clarity sake, the dimensions of the elements shown in these FIGS. correspond neither to actual dimensions nor to actual dimensional ratios. In particular, all resonator deformations represented are enlarged to an exaggerated extent for better visibility. Furthermore, identical references indicated in different figures designate elements or measurements which are identical or which have identical functions.

Figure 9:
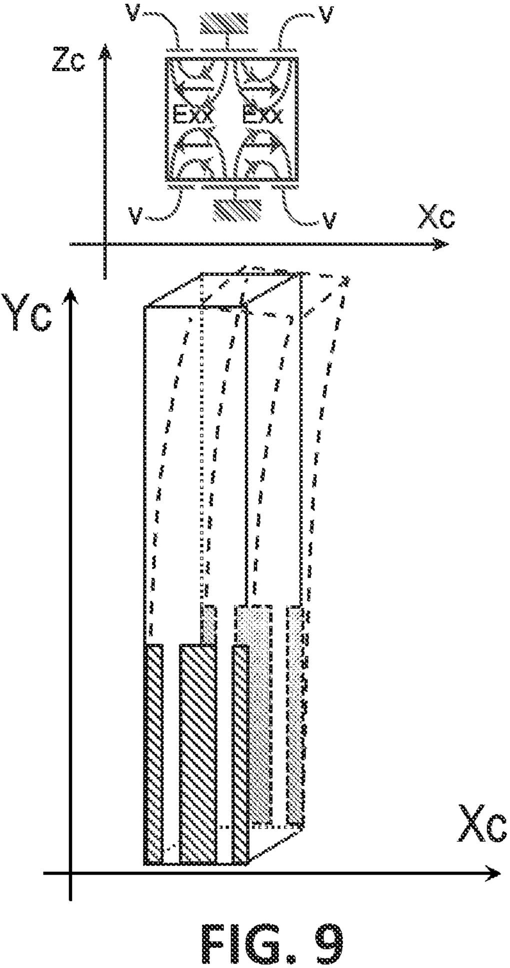
FIG. 9 is a reminder of one possible electrode configuration, suitable for a piezoelectric coupling which can be used to excite and detect flexural vibrations of a beam, in the case of a beam material which is piezoelectric and belongs to the trigonal system and symmetry class 32, such as α-quartz.

All figures except [FIG. 9] show inertial angular position sensors or resonators which are etched into a wafer of solid material, having two flat and parallel faces. These figures are views in a plane which is parallel to the two faces of the wafer, in between and equidistant from these two faces. This plane is therefore a plane of symmetry of each sensor or resonator, referred to as the midplane. The wafer used can have a thickness of several micrometers to several millimeters, when this thickness is measured perpendicularly to its faces, and for small sensors produced by collective etching processes.

Figure 1C:
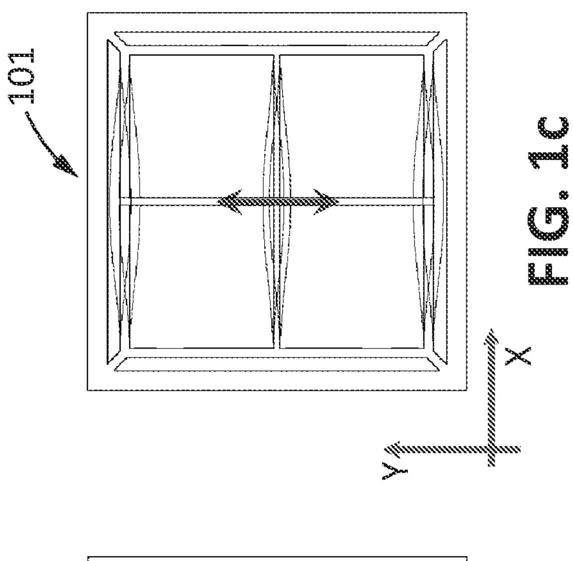
FIG. 1*c* corresponds to [FIG. 1*b*], showing a second degenerate mode of vibration of the first inertial angular position sensor.
Figure 1B:
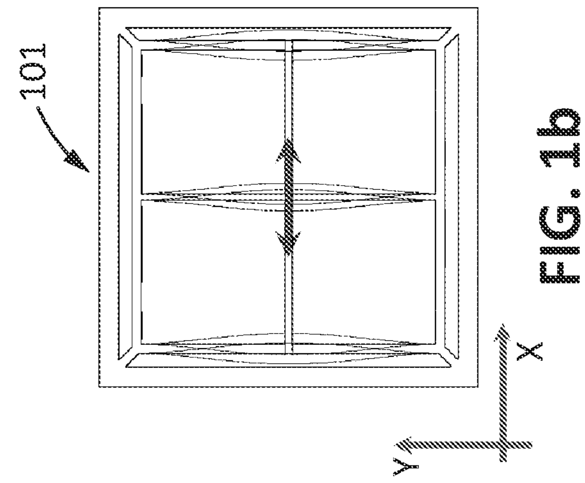
FIG. 1*b* corresponds to [FIG. 1*a*], showing a first degenerate mode of vibration of the first inertial angular position sensor.
Figure 1A:
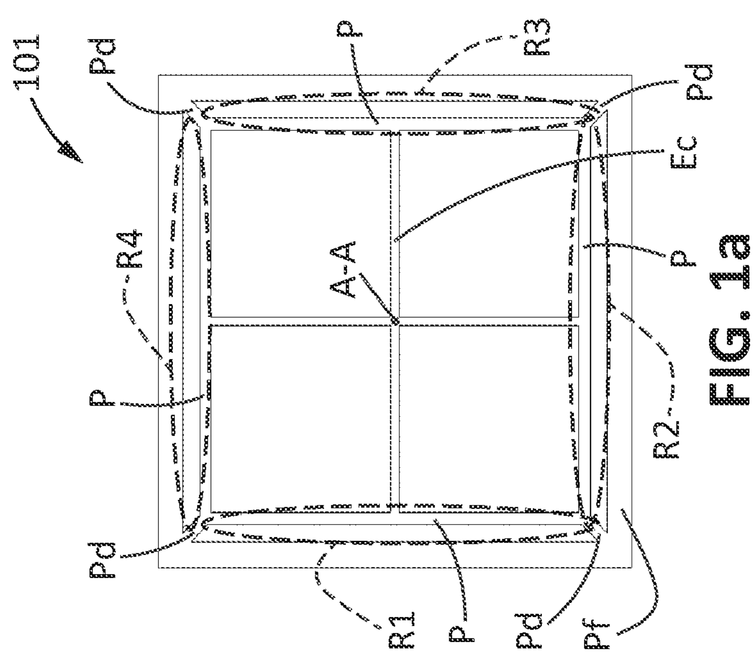
FIG. 1*a* is a plan view of a first inertial angular position sensor which is in accordance with the invention.
Figure 2C:
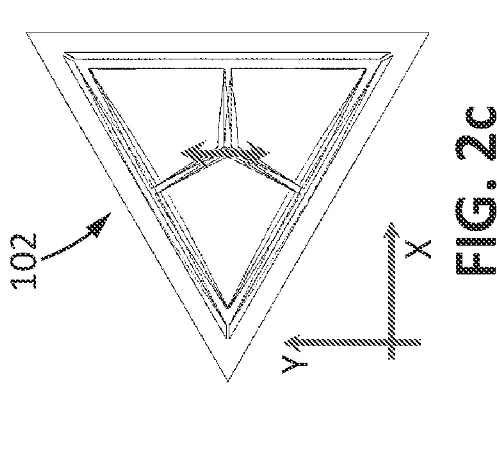
FIG. 2*c* corresponds to [FIG. 1*c*] for the second inertial angular position sensor.
Figure 2B:
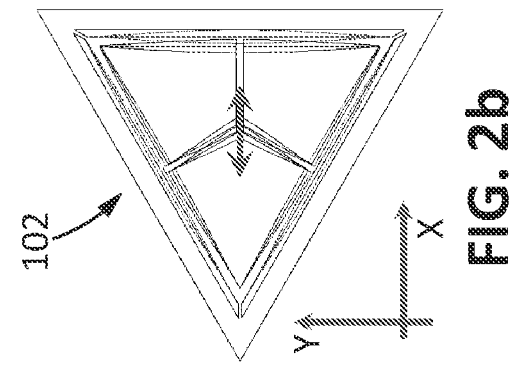
FIG. 2*b* corresponds to [FIG. 1*b*] for the second inertial angular position sensor.
Figure 2A:
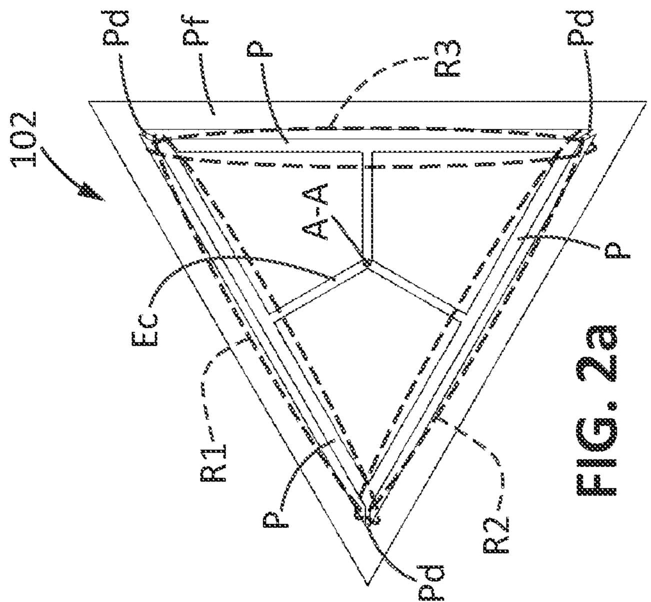
FIG. 2*a* corresponds to [FIG. 1*a*] for a second inertial angular position sensor which is also in accordance with the invention.
Figures 3A, 3B, 3C:
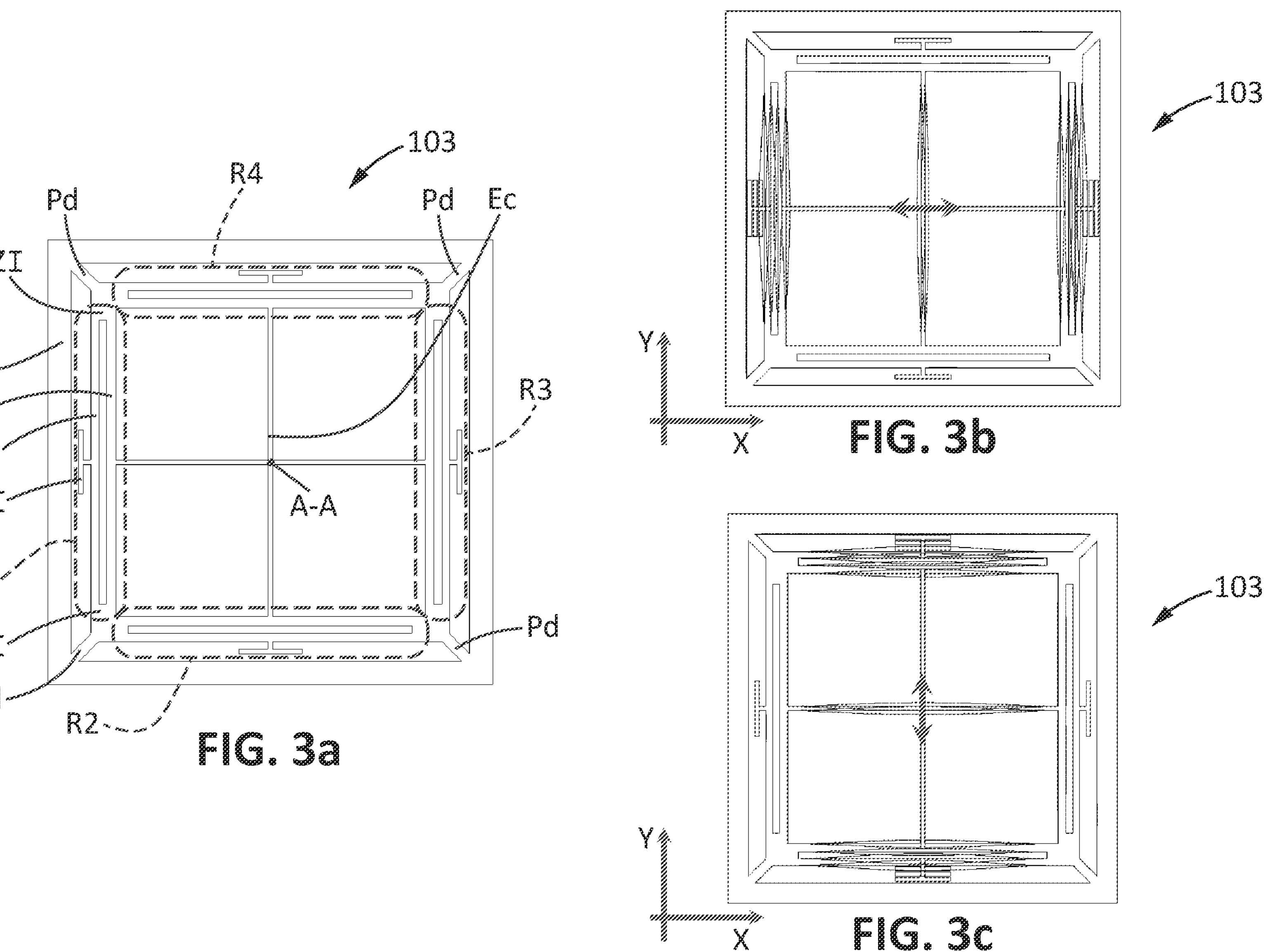
FIG. 3*a* corresponds to [FIG. 1*a*] for a third inertial angular position sensor which is also in accordance with the invention.
FIG. 3*b* corresponds to [FIG. 1*b*] for the third inertial angular position sensor.
FIG. 3*c* corresponds to [FIG. 1*c*] for the third inertial angular position sensor.

[FIG. 1*a*]-[FIG. 1*c*], [FIG. 2*a*]-[FIG. 2*c*], [FIG. 3*a*]-[FIG. 3*c*], and [FIG. 4*a*]-[FIG. 4*c*] do not correspond to the claimed invention, and the provided portions of the description concerning these figures are intended to facilitate understanding of the invention and its advantages.

[FIG. 1*a*] shows a first inertial angular position sensor 101 according to the invention, with four resonators: n=4. It comprises a support part, also called a fixed part and designated by the reference Pf, in the form of a square peripheral frame. This fixed part Pf is intended to fix the sensor 101 to a base (not shown), and to establish electrical contacts between electrodes (not shown) carried by the resonators and an electronic excitation and detection circuit (not shown). Four beams P are located inside the frame of the fixed part Pf, parallel to its four sides and at a distance from them. Each beam P is connected at its two opposite ends to the fixed part Pf, by two feet Pd which are located in the corners of the fixed part Pf. Thus, each foot Pd is shared by two adjacent beams P. Each beam P can then vibrate flexurally between its two ends, in parallel to the midplane, and thus constitutes a separate resonator, the four resonators being individually designated by the references R1, R2, R3, and R4. Each beam P thus constitutes the vibrating portion of each resonator. The sensor 101 further comprises a coupling element in the form of a cross, designated Ec. The coupling element Ec is also etched into the wafer, similarly to the beams P and the feet Pd, and the ends of the arms of the coupling element Ec are connected one-on-one to the respective middles of the beams P. Thus, the entirety of the sensor 101, comprising the fixed part Pf, the feet Pd, the beams P, and the coupling element Ec, is invariant under rotation of $\pi/2$ about an axis perpendicular to the midplane and passing through the center of the sensor. Such a sensor has two degenerate modes, which correspond to oscillating displacements of a central point of the coupling element Ec which are parallel to the X axis for the first mode, as shown in [FIG. 1*b*], and parallel to the Y axis for the second mode, as shown in [FIG. 1 C]. Due to the symmetry, these two modes have respective vibration frequency values which are identical, so they are degenerate. Furthermore, the Coriolis force as generated by rotation of the sensor around axis A-A which is perpendicular to the wafer and which passes through the center of the sensor, as exerted on the coupling element Ec, produces coupling between these two degenerate modes. Thus, the rotation of the sensor 101 generates a transfer of vibrational energy from one mode to the other. This first inertial angular position sensor 101 is therefore suitable for creating an integrating gyrometer having axis A-A as the sensitive axis.

[FIG. 2*a*] shows a second inertial angular position sensor 102 which is also in accordance with the invention, but with three resonators: n=3. The design of this second sensor is the same as that of the first sensor of [FIG. 1*a*], but replacing the square shape of the frame of the fixed part Pf with an equilateral triangle shape. It therefore comprises three separate resonators R1-R3 each formed by a beam P which is connected to the fixed part Pf by its two opposite ends, and a coupling element Ec with three arms each separated by 120° from its neighboring arm. Each arm of the coupling element Ec is still connected to the middle of one of the three beams P. This second sensor 102 still has two degenerate modes of vibration: the first mode in which the central point of the coupling element Ec has oscillating movements which are parallel to the X axis, as shown in [FIG. 2*b*], and the second mode in which the central point of the coupling element Ec has oscillating movements which are parallel to the Y axis, as shown in [FIG. 2*c*]. This second inertial angular position sensor 102 is therefore also suitable for producing an integrating gyrometer.

However, for the two sensors of [FIG. 1*a*]-[FIG. 1*c*] and [FIG. 2*a*]-[FIG. 2*c*], the momentums involved in each of both degenerate modes of vibration are not compensated, and because of this, the fixed part Pf is moved by a movement which is the reverse of that of the set of resonators and the coupling element Ec. This transmission of movement to the fixed part Pf occurs via the feet Pd, and the sensor then becomes very sensitive to the attachment conditions of the fixed part Pf to the external base. In particular, a loss of symmetry between the X and Y axes which is caused by these attachment conditions results in an interruption in the degeneracy between the two natural modes of vibration of the sensor. The gyro then no longer functions as an integrator. However, in general, the conditions for the attachment of the fixed part Pf to the external base cannot be sufficiently controlled, in particular when this attachment is made by gluing. In addition, movement transmitted to the fixed part Pf causes losses of vibrational energy in the modes of vibration, which creates resonant overvoltage and degrades the sensitivity of the gyro. The improvement of the invention which is now described overcomes this disadvantage.

According to this improvement, each of the resonators of the sensor is individually balanced, so that it becomes dynamically decoupled from the fixed part Pf. The vibrations of each resonator therefore do not cause movement of the foot (feet) to which it is connected, so that no loss of vibrational energy occurs through the feet. The degenerate modes of vibration of the sensor thus become insensitive to symmetry defects in the attachment of its fixed part Pf on the external base, so that a gyrometer which integrates the sensor can have a high-performance integrating operation. In other words, this improvement of the invention consists of using a resonator model which is intrinsically balanced, in addition to the axisymmetric arrangement of order n of the inertial angular position sensor.

Resonators which are thus decoupled from their fixed part are known from the prior art, in particular the double-ended tuning fork described in U.S. Pat. No. 4,215,570, and the simple double-ended blade with inertial masses at both ends as described in FR 8,418,587.

Put another way, this improvement of the invention consists of using a resonator model which is intrinsically balanced in the axisymmetric arrangement of order n of the inertial angular position sensor.

The third inertial angular position sensor 103 of [FIG. 3*a*] again uses the axial symmetry of order 4 (n=4) of the sensor of [FIG. 1*a*], but with the resonator model based on a double-ended tuning fork. Thus, each of the resonators R1-R4 consists of two beams $P_1$ and $P_2$ which are parallel and each extend between the two feet Pd to which that resonator is connected. Preferably, each resonator R1-R4 has an intermediate area ZI between the beams $P_1$ and $P_2$ and each foot Pd, in which the two beams are embedded. Such intermediate areas ZI eliminate residual forces which would otherwise be transmitted by the beams $P_1$ and $P_2$ to the feet Pd. Furthermore, additional inertial masses MI are rigidly connected to beam $P_2$ of each resonator in order to balance the inertial contribution generated by the coupling element Ec on the beam $P_1$ of this resonator. Preferably, each additional inertial mass MI can be composed of a wafer segment which is connected by its center to the middle of beam $P_2$, so as not to modify the stiffness of the latter or constitute a loss of symmetry within the resonator. [FIG. 3*b*] and [FIG. 3*c*] show the two degenerate modes of vibration which are then in effect for such a sensor, with movements of the coupling element Ec which are respectively parallel to the X axis or to the Y axis. For each of these degenerate modes of vibration, the two beams $P_1$ and $P_2$ vibrate in phase opposition, moving apart and then moving towards each other by respective bending parallel to the midplane, so that no resulting force is transmitted to each foot Pd of the sensor 103. The fixed part Pf of the sensor 103 therefore remains stationary during the vibrations of each of the two degenerate modes, so the gyro can have a high-performance integrating operation.

The fourth inertial angular position sensor 104 of [FIG. 4*a*] again uses the axial symmetry of order 4 (n=4) of the sensor of [FIG. 1*a*], but this time uses a resonator model as described in FR 8,418,587 to form each of the resonators R1-R4. Each resonator thus comprises two inertial masses $MI_1$ and $MI_2$, which are each connected to the fixed part Pf by a respective foot Pd acting as a hinge. The inertial masses $MI_1$ and $MI_2$ are additionally connected to each other by a flexible segment S. When each resonator R1-R4 vibrates, its two inertial masses $MI_1$ and $MI_2$ rotate in opposite directions while moving towards the same side, parallel to the faces of the wafer, while a central part of the flexible segment S moves towards the opposite side. Each arm of the coupling element Ec is connected to the middle of the flexible segment S of one of the resonators R1-R4. Then, by adopting dimensions for the inertial masses $MI_1$ and $MI_2$ which take into account the mass of the coupling element Ec, and by possibly adding an additional inertial mass to the center of the coupling element Ec, each resonator R1-R4 appears individually balanced within the sensor 104. [FIG. 4*b*] and [FIG. 4*c*] show the two degenerate modes of vibration of such a sensor 104, with movements of the coupling element Ec which are parallel to the X axis or Y axis, respectively. A gyrometer which incorporates this fourth inertial angular position sensor 104 can have a high-performance integrating operation.

Figures 5A, 5B:
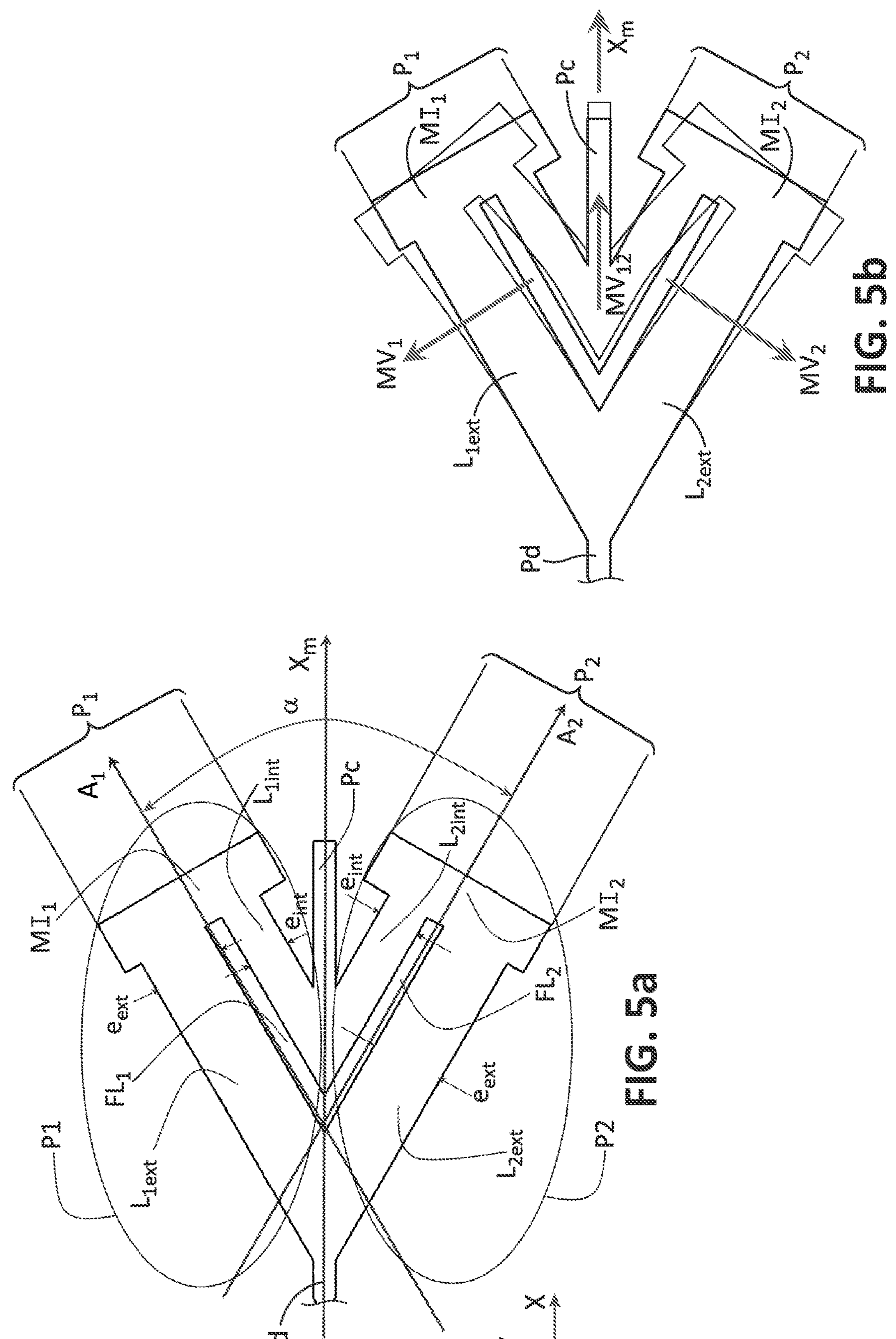
FIG. 5*a* is a plan view which shows a first resonator model that can be used in preferred embodiments of the invention.
FIG. 5*b* corresponds to [FIG. 5*a*], showing deformations of a mode of vibration of the first resonator model, with associated momentums.

However, the two sensor configurations of [FIG. 3*a*] and [FIG. 4*a*] are bulky, and for this reason are poorly suited for applications which require high levels of miniaturization. FIG. 5*a* and [FIG. 5*c*] show two new resonator models which are balanced, and which can be used in inertial angular position sensors which are again in accordance with the improvement of the invention. Moreover, these two new resonator models can be made with reduced dimensions compared to the resonator models which appear in [FIG. 3*a*] and [FIG. 4*a*].

Figure 5D:
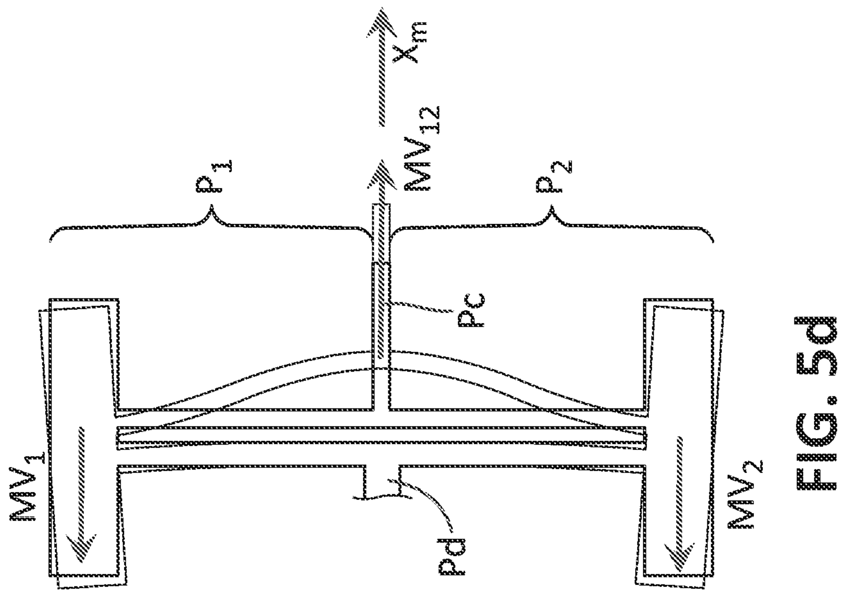
FIG. 5*d* corresponds to [FIG. 5*b*] for the second resonator model.
Figure 5C:
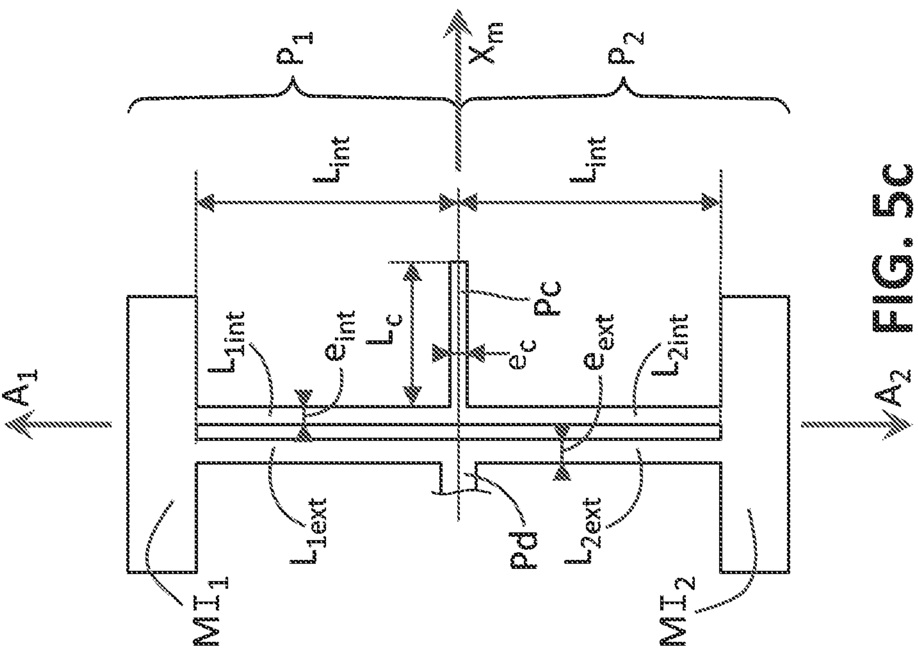
FIG. 5*c* corresponds to [FIG. 5*a*] for a second resonator model which can be used in other preferred embodiments of the invention.

Unlike the resonators previously used, each of those of [FIG. 5*a*] and [FIG. 5*c*] is connected to the fixed part Pf by only a single foot Pd. In addition, each resonator is individually composed of a vibrating portion with two extensions, designated $P_1$ and $P_2$ respectively, and which extend longitudinally along respective axes $A_1$ and $A_2$. For the resonator of [FIG. 5*a*], the axes $A_1$ and $A_2$ form an angle α between them which is equal to 60°, and for the resonator of [FIG. 5*c*], the angle α between the axes $A_1$ and $A_2$ is equal to 180°. The two extensions $P_1$ and $P_2$ extend from the foot Pd symmetrically on either side of a center axis $X_m$ which is coincident with a longitudinal direction of the foot Pd. This center axis $X_m$ corresponds to the intersection between the midplane, already introduced, and another plane of symmetry which is orthogonal to the faces of the wafer and about which the two extensions $P_1$ and P2 correspond by mirror symmetry. In the remainder of the present description, and by analogy with a tuning fork resonator as described in U.S. Pat. No. 3,683,213, the two extensions $P_1$ and $P_2$ are also called beams $P_1$ and $P_2$. According to an original characteristic of the resonators of [FIG. 5*a*] and [FIG. 5*c*], a longitudinal slot is provided in each beam $P_1$, $P_2$, and respectively designated by the reference $FL_1$, $FL_2$. These two longitudinal slots $FL_1$ and $FL_2$ meet at the center axis $X_m$ of the resonator. Each beam $P_i$, the index i being equal to 1 or 2, is thus composed of two blades $L_{iext}$ and $L_{iint}$. In the general part of this description, blade $L_{1ext}$ (respectively $L_{2ext}$) was referred to as the primary segment of extension $P_1$ (resp. $P_2$), and blade $L_{1int}$ (respectively $L_{2int}$) was referred to as the secondary segment of extension $P_1$ (resp. $P_2$). Thus, the two blades $L_{1ext}$ and $L_{2ext}$ are connected to the foot Pd, and extend to the respective distal ends of the beams $P_1$ and $P_2$, where they are connected one-on-one to the two blades $L_{1int}$ and $L_{2int}$. Each beam or extension $P_1$, $P_2$ thus is meander shaped between the center axis $X_m$ and its distal end. In addition, blades $L_{1int}$ and $L_{2int}$ are interconnected at the center axis $X_m$, by respective proximal ends of these two blades $L_{1int}$ and $L_{2int}$. The two longitudinal slots $FL_1$ and $FL_2$ of the respective beams $P_1$ and $P_2$ also meet at the center axis $X_m$, such that the joining of the respective proximal ends of the two blades $L_{1int}$ and $L_{2int}$ is separated from blades $L_{1ext}$ and $L_{2ext}$ and from the foot Pd.

For the resonator of [FIG. 5*a*], and as shown in [FIG. 5*b*], when, during vibration of the resonator, the distal ends of extensions $P_1$ and $P_2$ symmetrically move away from the center axis $X_m$ in opposite directions, blades $L_{iext}$ and $L_{2ext}$ have respective momentums, $MV_1$ and $MV_2$, which are oriented towards the same side of the resonator as the foot Pd, obliquely but symmetrically, and the common junction of blades $L_{1int}$ and $L_{2int}$ has a momentum $MV_{12}$ which is parallel to the center axis $X_m$ while being away from the foot Pd. As a result, blades $L_{1int}$ and $L_{2int}$ have respective momentums which are oriented, obliquely but symmetrically, towards the side of the resonator which is opposite to the foot Pd. Then, a distribution of mass in the vibrating portion, between all the blades $L_{1ext}$, $L_{2ext}$, $L_{1int}$ and $L_{2int}$, can be such that movement of the foot Pd which results from these momentums is zero or almost zero. Due to this lack of movement of the foot Pd, the transmission of vibrational energy from the vibrating portion to the support part Pf is zero or very low, so the quality factor of the resonator can be high. The optimized distribution of mass between the four blades of the vibrating portion is still symmetrical relative to the center axis, and can be obtained by assigning a common thickness $e_{ext}$ to the two blades $L_{1ext}$ and $L_{2ext}$ which is different from that of the two blades $L_{1int}$ and $L_{2int}$, denoted $e_{int}$. When such optimization is applied, the resonator is balanced. The blade thicknesses $e_{ext}$ and $e_{int}$ are measured parallel to the faces of the wafer. The values of the resonator dimensions which provide its balancing can be determined according to several methods, and in particular by using finite element calculations.

According to two improvements of the resonator which are shown together in [FIG. 5*a*] but which can be used independently of each other, the vibrating portion of the resonator can be supplemented by two inertial masses $MI_1$ and $MI_2$ for the first improvement, and by a stem Pc for the second improvement. Preferably, the two inertial masses $MI_1$ and $MI_2$ are located at the distal ends of the two beams $P_1$ and $P_2$, and are identical. They can each be formed by widening the corresponding beam $P_1$, $P_2$ at its distal end. The stem Pc can be formed by an additional blade which extends from the joining of the proximal ends of blades $L_{1int}$ and $L_{2int}$, parallel to the center axis $X_m$ and superimposed thereon, in a direction away from the foot Pd. Advantageously, the stem Pc is also symmetrical relative to the center axis $X_m$. The addition of the two inertial masses $MI_1$ and $MI_2$, and/or of the stem Pc, to the vibrating portion of the resonator makes it possible to obtain balancing of the resonator with additional degrees of freedom, and therefore more easily. [FIG. 5*b*] shows the movements of the inertial masses $MI_1$ and $MI_2$ as well as that of the stem Pc at the same instant during vibration of the resonator. The two inertial masses $MI_1$ and $MI_2$ then have momentum components $MV_1$ and $MV_2$ along the center axis $X_m$ which are opposite to that $MV_{12}$ of the stem Pc. These momentum components of the inertial masses $MI_1$ and $MI_2$ and of the stem Pc combine with those of the four blades $L_{1ext}$, $L_{2ext}$, $L_{1int}$ and $L_{2int}$ to produce a movement of the foot Pd which is zero or substantially zero.

For the resonator of [FIG. 5*c*], and as shown in [FIG. 5*d*], during vibration of the resonator, the two inertial masses $MI_1$ and $MI_2$ move in phase, parallel to the center axis $X_m$, while the joining between blades $L_{1int}$ and $L_{2int}$ also moves parallel to the center axis $X_m$ but in phase opposition relative to the inertial masses $MI_1$ and $MI_2$. This results in at least partial compensation for the momentums involved, so that movement of the foot Pd can be reduced or eliminated by determining appropriate dimensions for the resonator. The inertial masses $MI_1$ and $MI_2$ are necessary in order to obtain exact balancing of the resonator, while the stem Pc is optional although it provides an additional degree of freedom for the dimensional values which provide balancing of the resonator.

Figures 6A, 6B, 6C:
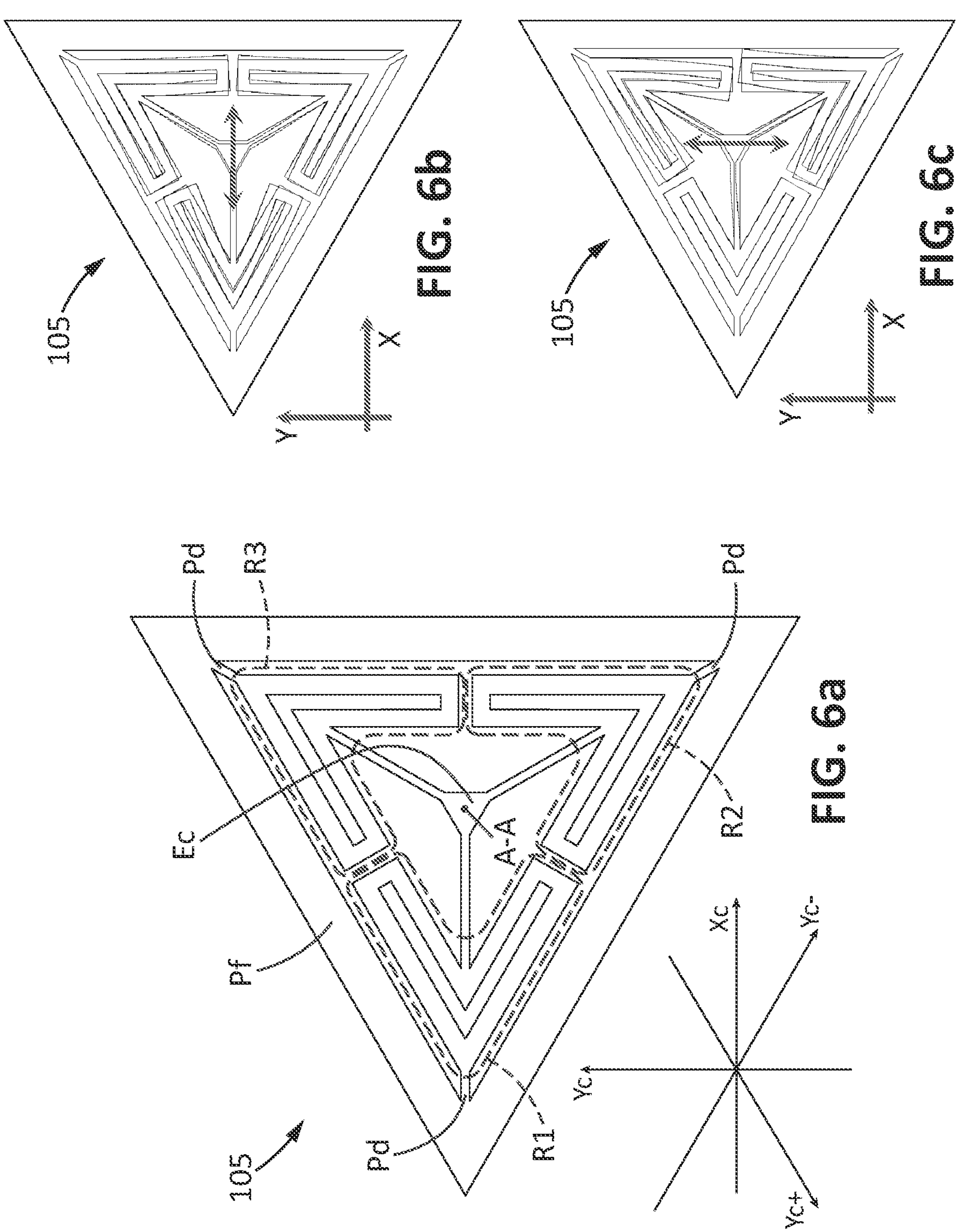
FIG. 6*a* corresponds to [FIG. 1*a*] for a fifth inertial angular position sensor which is also in accordance with the invention, and which uses the first resonator model of [FIG. 5*a*]-[FIG. 5*b*]
FIG. 6*b* corresponds to [FIG. 1*b*] for the fifth inertial angular position sensor.
FIG. 6*c* corresponds to [FIG. 1*c*] for the fifth inertial angular position sensor.

The fifth inertial angular position sensor 105 of [FIG. 6*a*] is obtained from the second sensor of [FIG. 2*a*], using the resonator model of [FIG. 5*a*] instead of the single-beam resonator model which is held by its two ends, for each of the resonators R1-R3. The foot Pd of each of the three resonators R1-R3 is connected to the fixed part Pf in one of the corners of the triangular frame which is formed by the fixed part. [FIG. 6*b*] and [FIG. 6*c*] show the two degenerate modes of vibration which are then in effect for such a fifth sensor, with the movements of the coupling element Ec which are parallel either to the X axis or to the Y axis.

Figures 7A, 7B, 7C:
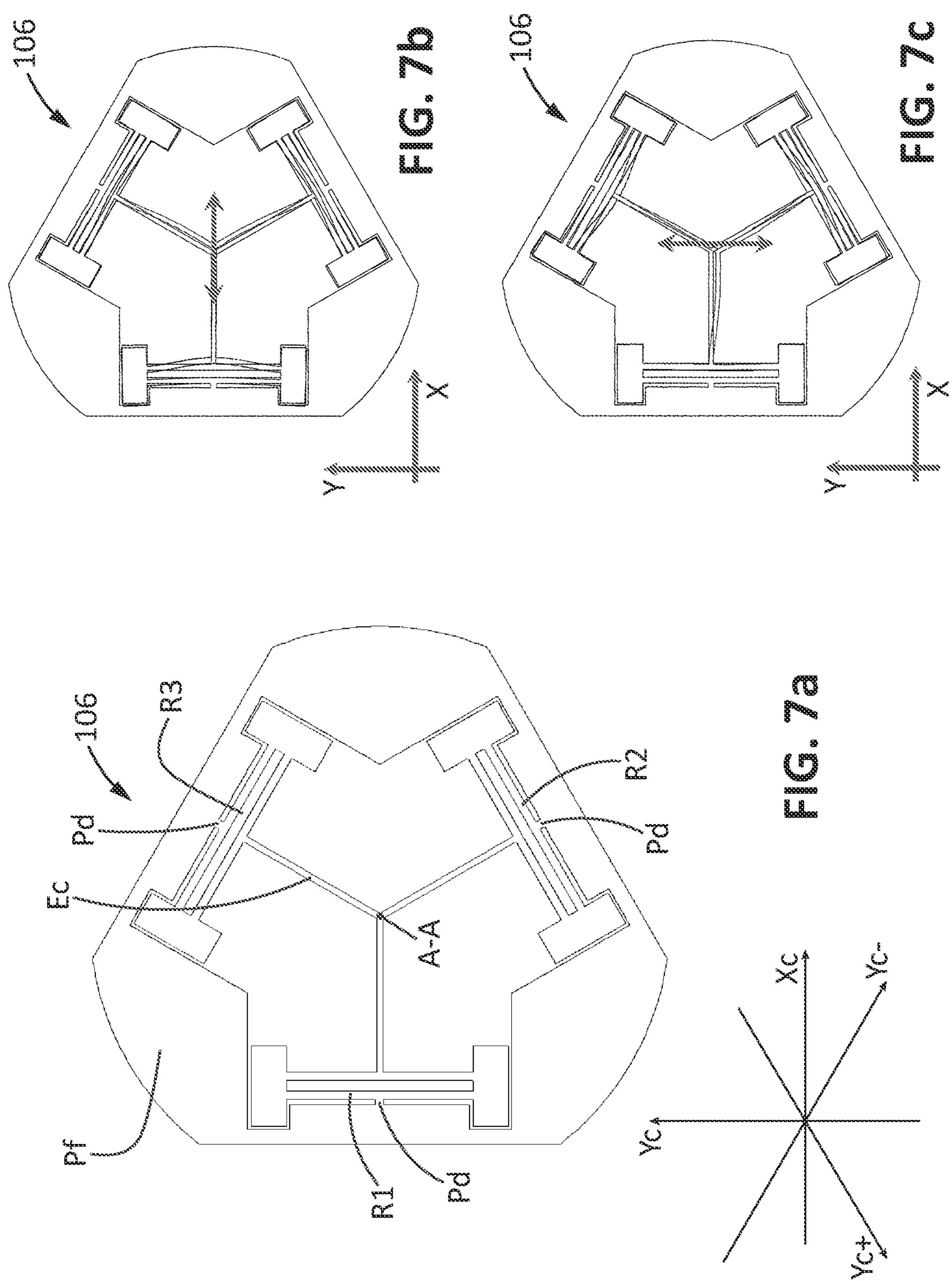
FIG. 7*a* corresponds to [FIG. 1*a*] for a sixth inertial angular position sensor which is also in accordance with the invention, and which uses the second resonator model of [FIG. 5*c*]-[FIG. 5*d*]
FIG. 7*b* corresponds to [FIG. 1*b*] for the sixth inertial angular position sensor.
FIG. 7*c* corresponds to [FIG. 1*c*] for the sixth inertial angular position sensor.

The sixth inertial angular position sensor 106 of [FIG. 7*a*] is again obtained from the second sensor of [FIG. 2*a*], but this time using the resonator model of [FIG. 5*c*] instead of the single-beam resonator model which is held by its two ends, for each of the resonators R1-R3. The foot Pd of each of the three resonators R1-R3 is connected to the fixed part Pf in the middle of one of the sides of the frame which is formed by the fixed part. [FIG. 7*b*] and [FIG. 7*c*] show the two degenerate modes of vibration which are then in effect for such a sixth sensor, with the movements of the coupling element Ec which are parallel either to the X axis or to the Y axis.

Figures 8A, 8B, 8C:
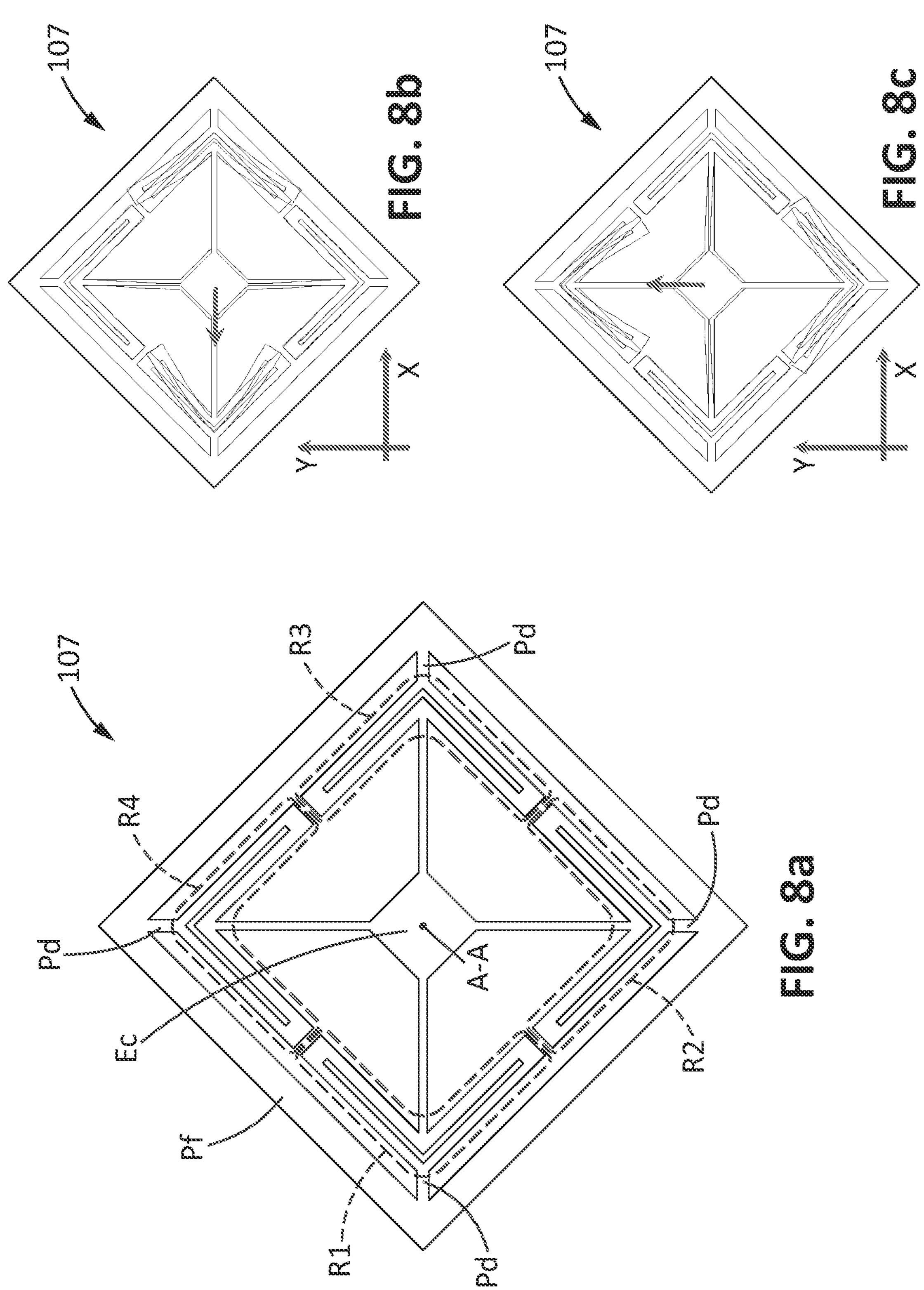
FIG. 8*a* corresponds to [FIG. 1*a*] for a seventh inertial angular position sensor which is also in accordance with the invention.
FIG. 8*b* corresponds to [FIG. 1*b*] for the seventh inertial angular position sensor.
FIG. 8*c* corresponds to [FIG. 1*c*] for the seventh inertial angular position sensor.

Finally, the seventh inertial angular position sensor 107 of [FIG. 8*a*] is obtained from the first sensor of [FIG. 1*a*], but this time using the resonator model of [FIG. 5*a*] in which the angle $\alpha$ is now equal to 90°, instead of the single beam resonator model which is held by its two ends, for each of the resonators R1-R4. The foot Pd of each of the four resonators R1-R4 is connected to the fixed part Pf in one of the corners of the square frame which is formed by the fixed part. [FIG. 8*b*] and [FIG. 8*c*] show the two degenerate modes of vibration which are then in effect for such a seventh sensor, with the movements of the coupling element Ec which are parallel either to the X axis or to the Y axis.

These fifth, sixth, and seventh inertial angular position sensors, because they are made from resonators which are individually balanced, make it possible to obtain high-performance integrating gyrometers, in particular having high or very high quality factor values for the pilot mode and sensing mode. The gyros thus obtained can be very sensitive.

All the inertial angular position sensors which have just been described can advantageously be made from monocrystalline wafers of $\alpha$-quartz ($\alpha$-$SiO_2$) or any other single crystal of the trigonal system of symmetry class 32, such as gallium orthophosphate ($GaPO_4$), germanium oxide ($GeO_2$), gallium arsenate ($GaAsO_4$), or crystals of the LGX family: langasite (LGS or $La_3Ga_5SiO_{14}$), langatate (LGT or $La_3Ga_5$, 5TaO, $5O_{14}$) or langanite (LGN or $La_3Ga_5$, 5NbO, $5O_{14}$). These materials are piezoelectric. In this case, and when resonators of the model in [FIG. 5*a*] or of the model in [FIG. 5*c*] are used, the orientations of the beams $P_1$ and $P_2$ of each resonator of the sensor, meaning their longitudinal axes $A_1$ and $A_2$, are advantageously chosen to be parallel to crystallographic axes Yc, Yc+, and Yc−, and the faces of the wafer are parallel to crystallographic plane Xc-Yc. Such an orientation of the sensor pattern relative to the crystal of the wafer makes it possible to benefit from an optimal piezoelectric coupling for exciting the pilot mode and detecting the sensing mode, in accordance with their respective flexural vibrations in crystallographic plane Xc-Yc. Indeed, the piezoelectric tensor of trigonal class crystals offers optimal coupling for deformation Syy, along the axis of each beam, with the electrical field Exx. This makes it possible to excite, by direct piezoelectric effect, the flexural vibration of the pilot mode via electrodes which are placed along the blades in order to generate an electrical field Exx, and to detect deformations Syy via electrical charges generated by an indirect piezoelectric effect on these same electrodes. Several different electrode configurations are known for this. According to a first of these configurations, which is illustrated by [FIG. 9], three electrode segments are arranged on each of both faces of each blade which is coincident with one of the faces of the wafer. The electrodes of such a first configuration are simple to produce by processes of conductive material deposition. According to another possible configuration, two electrode segments are arranged on each of both sides of each blade which are perpendicular to the faces of the wafer. This other configuration is more effective but more difficult to achieve, as described for example in U.S. Pat. No. 4,524,619. The same orientation of the pattern of the sensor relative to the crystal of the wafer also makes it possible to benefit from crystallographic axis Z along which the wet chemical etching speed is higher, this axis Z then being perpendicular to the faces of the wafer used. The sensors can then be produced at low cost using a wet chemical etching process, in particular such a process which uses a mixture of ammonium fluoride ($NH_4F$) and hydrofluoric acid (HF). Furthermore, each resonator in accordance with [FIG. 5*a*] or [FIG. 5*c*], and which is fabricated in a wafer of monocrystalline material of the trigonal system of symmetry class 32, and with the orientation indicated above relative to the crystallographic axes, is obtained directly with no symmetry defect at the end of the wet chemical etching step. Each resonator is therefore thus balanced directly, and the resonators of the inertial angular position sensors of [FIG. 6*a*] and [FIG. 7*a*] are strictly identical.

Such possibility for manufacturing the pattern of the sensors using only a wet chemical etching process is particularly advantageous, because of the low cost afforded by this collective manufacturing process for microdevices. In addition, the wet chemical etching process preserves the intrinsic quality factors of crystal. Indeed, chemical etching is based on a local reaction which produces dissolution of the crystal, atom by atom. Due to this fact, it does not alter the crystal lattice of the remaining wafer material which forms the sensor. This is not the case for etching based on local abrasion, such as ultrasonic machining which uses fine abrasive particles excited by ultrasonic waves generated between a probe (sonotrode) and the surface to be etched, or based on ion bombardment which uses the kinetic energy of ions. These last two techniques alter the crystal lattice at the edges of the etching, over characteristic distances of a few tens of nanometers to a few micrometers for the highest-energy etchings, and the intrinsic quality coefficient of the resonators is consequently reduced, all the more so when significant miniaturization of the sensor is desired.

It is understood that the invention is not limited to the piezoelectric materials of the trigonal system of symmetry class 32. The principle of identical resonators which are decoupled relative to their attachment, arranged in an axisymmetric configuration, and coupled to each other by a coupling element which is also axisymmetric, can be combined with the use of other materials, in particular silicon crystal. Given the cubic-class crystalline structure of monocrystalline silicon, arrangements based on four resonators are preferable, such as those of [FIG. 1*a*], [FIG. 3*a*], [FIG. 4*a*], and [FIG. 8*a*]. Excitation of pilot mode can then be achieved by applying electrostatic forces, and the amplitude of the sensing mode can be determined by measuring the capacitance between a fixed part of the sensor and a moving part of the sensor.

The invention claimed is:

1. An inertial angular position sensor, comprising at least three identical resonators arranged symmetrically about an axis, referred to as a sensitive axis, so as to be invariant under a rotation of $2\pi/n$ about the sensitive axis, where n is the number of resonators of the sensor, the n resonators being coupled together so that the sensor has at least two degenerate modes of vibration, allowing to characterize a rotation of the sensor about the sensitive axis, each of the resonators comprising a respective portion of a wafer having two opposite faces which are flat and parallel, the wafer portion dedicated to each resonator being intended to vibrate flexurally during use of the sensor, and referred to as a vibrating portion of said resonator, the wafer being common to the n resonators of the sensor, and the sensor further comprising a coupling element which connects the vibrating portion of each resonator to the vibrating portions of all the others among the n resonators of the sensor, the coupling element also being invariant under the rotation of $2\pi/n$ about the sensitive axis, and the vibrating portions of the n resonators being angularly distributed about the coupling element, wherein the vibrating portion of each resonator is connected to a support part of the sensor which is external to the vibrating portions and to the coupling element, by an intermediate segment of the wafer, referred to as a foot, which is dedicated to the resonator, said foot being integral with the vibrating portion and forming a connection between the support part and said vibrating portion, and wherein, for each resonator:

the vibrating portion of said resonator has a first plane of symmetry, referred to as a midplane, which is parallel to both faces of the wafer and equidistant from said both faces, and a second plane of symmetry, referred to as a plane of symmetry orthogonal to the wafer, which is perpendicular to the midplane and passes longitudinally through the connection formed by the foot between the support part and the vibrating portion, an intersection between the midplane and the plane of symmetry orthogonal to the wafer forms a center axis of the vibrating portion, the vibrating portion comprises two extensions which are each intended to vibrate flexurally, said two extensions extending symmetrically from the foot on each side of the plane of symmetry orthogonal to the wafer, each extension is provided with a longitudinal slot which passes through the vibrating portion perpendicularly to the midplane, from the plane of symmetry orthogonal to the wafer towards a distal end of said extension but without reaching said distal end, such that each extension is meander shaped, the respective slots of both of the two extensions being symmetrical relative to the plane of symmetry orthogonal to the wafer, and meeting at said plane of symmetry orthogonal to the wafer, so that the vibrating portion comprises two primary segments which each connect the foot to the distal end of one of the extensions, and two secondary segments which are interconnected at the plane of symmetry orthogonal to the wafer by respective proximal ends of said secondary segments, and which each extend to the distal end of one of the extensions so as to connect to one of the primary segments at said distal end, so that, for both of the at least two degenerate modes of vibration of the sensor allowing to characterize the rotation about the sensitive axis, the vibrating portion of each resonator only has movements which are parallel to the midplane and which are symmetrical relative to the plane of symmetry orthogonal to the wafer, both of the two primary segments having instantaneous velocity components, parallel to the center axis, which at each instant during vibration, are in the opposite direction to that of instantaneous velocity components of the secondary segments, also parallel to the center axis.

2. The sensor of claim 1, wherein the coupling element is composed of a pattern formed in the wafer, and is integral with the vibrating portion of each resonator.

3. The sensor of claim 1, wherein, for each resonator, the vibrating portion has a mass distribution such that each degenerate mode of vibration of the sensor which comprises only movements parallel to the midplane and which is symmetrical relative to the plane of symmetry orthogonal to the wafer, for said resonator, does not cause any movement of the foot in parallel to the center axis.

4. The sensor of claim 1, wherein each extension of each resonator comprises, at the distal end of said each extension and parallel to the midplane, a widening relative to outer longitudinal edges of the primary and secondary segments of said extension.

5. The sensor of claim 1, wherein the coupling element is connected to the vibrating portion of each resonator at the interconnected proximal ends of the secondary segments, in parallel to the center axis of the resonator and on a side of said vibrating portion which is opposite to the foot of said resonator.

6. The sensor of claim 1, wherein the material of the wafer is monocrystalline and of trigonal class and piezoelectric, and wherein, for each resonator:

the center axis of the vibrating portion is parallel to an axis Xc of said material, and both of the two primary segments and both of the two secondary segments of the vibrating portion are parallel to axes Yc of said material.

7. The sensor of claim 1, wherein both of the two extensions of the vibrating portion of each resonator form an angle between them which is equal to 60°, 90° or 180°.

8. The sensor of claim 1, further comprising:

excitation means, adapted for generating flexural deformations of the vibrating portions of the n resonators according to a first one of the at least two degenerate modes of vibration; and detection means, adapted for measuring a vibration amplitude of the sensor according to another of the at least two degenerate modes of vibration which is different from said first degenerate mode of vibration.

9. A rate gyro comprising the inertial angular position sensor of claim 1.

* * * * *